United States Patent [19]

Gurny et al.

[11] Patent Number: 4,938,083

[45] Date of Patent: Jul. 3, 1990

[54] EXCHANGEABLE ATTACHMENT OF A PROBE STYLUS TO A PROBE FOR A COORDINATE MEASURING INSTALLATION

[75] Inventors: Werner Gurny, Wadgassen; Kurt Linder, Karlsruhe, both of Fed. Rep. of Germany

[73] Assignee: Wegu-Messtechnik GmbH, Wadgassen, Fed. Rep. of Germany

[21] Appl. No.: 334,927

[22] Filed: Apr. 7, 1989

[30] Foreign Application Priority Data

Apr. 8, 1988 [DE] Fed. Rep. of Germany ....... 3811851

[51] Int. Cl.⁵ ............................................. B23Q 3/155
[52] U.S. Cl. ...................................... 73/866.5; 33/559
[58] Field of Search ................... 73/105, 865.8, 866.5; 33/559-561; 248/309.4; 269/8; 279/1 M; 335/288, 289, 295

[56] References Cited

U.S. PATENT DOCUMENTS

| | | | |
|---|---|---|---|
| 2,275,839 | 3/1942 | Boehne | 335/288 |
| 4,637,119 | 1/1987 | Schneider et al. | 33/561 |
| 4,649,623 | 3/1987 | Schneider et al. | 33/561 |

Primary Examiner—Robert Raevis
Attorney, Agent, or Firm—Wood, Herron & Evans

[57] ABSTRACT

A mounting arrangement for the exchangeable attachment of a probe stylus or a probe styli combination on a probe for a coordinate measuring installation. The mounting arrangement is constituted from an electrically-operating clamping device with a permanent magnet and an electromagnet wherein the field from the electromagnet is superimposed on the field from the permanent magnet. A connecting member for the probe stylus or the probe styli combination is drawn through the intermediary of the clamping device against a bearing or support in the mounting member therefore on the probe which determines its position.

11 Claims, 2 Drawing Sheets

४,९३८,०८३

EXCHANGEABLE ATTACHMENT OF A PROBE STYLUS TO A PROBE FOR A COORDINATE MEASURING INSTALLATION

BACKGROUND OF THE INVENTION

1. Field of the Invention

The present invention relates to a mounting arrangement for the exchangeable attachment of a probe stylus or a probe styli combination on a probe for a coordinate measuring installation, which mounting arrangement is constituted from an electrically-operating clamping device with a permanent magnet and an electromagnet wherein the field from the electromagnet is superimposed on the field from the permanent magnet, and whereby a connecting member of the probe stylus or the probe styli combination is drawn through the intermediary of the clamping device against a bearing or support in the mounting member therefore on the probe which determines its position.

2. Discussion of the Prior Art

An exchangeable mounting or attachment for a probe stylus of the above-mentioned type is currently known from the disclosure of European Pat. No. 0 128 464. This known mounting arrangement possesses an isostatic three-point support, against which the contact plate for the probe stylus, which plate is assembled from three parts, is drawn by the electromagnetic clamping device. This three-part contact plate is constituted of steel. For an automatically-controlled probe exchange, the electromagnetic is supplied with direct current, as a result of which there is generated a magnetic field whose magnitude generally corresponds to that from the inserted permanent magnet; however, whose direction is opposite thereto. In view thereof, the resultant overall magnetic field becomes almost zero. Because of this superposition, the restraining force between the magnets and the three-part plate disappears, whereupon the probe styli combination is released from the mounting member with the aid of plate springs.

The assembly of the connecting member with the probe styli combination is relatively complex because of the three plates which are in connection with each other. In addition, there is encountered the necessity for employing plate springs in order to be able to displace the magnet components against the cover of a housing upon the elimination of the magnetic field from the permanent magnet, as a result of which there is formed the necessary air gap in order to be able to remove the probe styli combination from the probe housing. In this known holder for changing the probe stylus it is necessary to provide a relatively large number of individual parts, which must presently be coordinated with each other in order to afford an untroubled acceptable functioning.

SUMMARY OF THE INVENTION

Accordingly, proceeding from the above-mentioned state-of-the-art, it is an object of the present invention to provide a mounting arrangement for the exchangeable mounting or attachment of a probe stylus or a combination of probe styli on the probe or sensor head for a coordinate measuring installation of the above-mentioned type, in which it is possible to implement an automatic exchange of a probe stylus or a probe styli combination through the intermediary of only a few and technologically simple means with the utilization of an electrically-operating clamping device.

The foregoing object is inventively attained in that the connecting member is configured to be cup-shaped and is arranged coaxially below the mounting member, and receives a steel ring connected to the mounting member at a radial spacing with respect to the cylinder wall of the connecting member, in which a coil member with a coil winding is centrally inserted, whose unitarily attached upper shoulder supports the permanent magnet at its end surface, and with its mantle surface is arranged at a radial spacing relative to the steel ring in the connecting member. Hereby, the steel ring can have its end surface screwed together with the mounting member. Furthermore, the steel ring can be constructed with a base or foot surface which is smaller in comparison with the upper end surface, and with which it stands on the bottom of the connecting member.

By means of this simple construction with only a few individual parts, it is possible to obtain a secure mounting of the connecting member with the probes in the receiving member of the probe or sensor head, as well as facilitating for an automatic exchange in the absence of any technical problems. The unitarily constructed cup-shaped connecting member receives the coil member with the coil winding and is retained by the steel ring which is connected with the mounting member. Hereby, the small end surfaces of the steel ring, which stand on the bottom of the connecting member, form the retaining surfaces for the connecting member on the mounting member. The restraining force is, in this instance, obtained through the permanent magnet. At an effectuated supplying of the coil with electric current, there is generated a magnetic field (electromagnetic) which acts opposite to that of the permanent magnet, which produces across the air gap present between the shoulder of the coil member and the steel ring a separation of the retaining surface of the steel ring from the connecting member. This signifies that in addition to the permanent magnet and the electromagnet, it is necessary to merely provide one further component in order to be able to achieve the mounting and the exchange of the connecting member from the mounting member of the probe.

In order to be able to complete the exchange for a new connecting member on the mounting member which is always correct in position, there may be provided on the end surface of the cylindrical wall of the connecting member which faces towards the mounting member, three cylindrical half-rollers which are distributed uniformly with regard to each other, and whose longitudinal axes intersect at the zero coordinate point for the connecting member and which engage respectively between two hemispheres which are fastened in the mounting member.

A further weight-savings is achieved for the probe or sensor head when the steel ring is constructed from a plurality of segments and which are, selectively, spaced relative to each other. In order to achieve an extremely good restraining or cohesive force, the steel ring and/or the coil member may be formed from a material which possesses a high magnetic saturation. In a preferred construction, this material is Vakoflux. The permanent magnet, pursuant to another inventive feature, is formed from the noble metal consisting of neodymium.

The connecting member, pursuant to a further feature of the invention, can be provided with receiving apertures for the probe styli, which are located radially in the cylinder wall and in the bottom surface of the connecting member, and whose longitudinal axes intersect in the zero coordinate point of the connecting member.

In order to achieve a secure attachment for the cylindrical rollers and the hemi-spheres, which are in interengagement with each other, and to thereby form a secure, centered installation of the connecting member on the mounting member, the cylindrical half-rollers and the half spheres may presently be fastened to each other along their mounting surfaces by means of adhesives.

In order that the permanent magnet will securely remain in its intended position, it can be inserted into oppositely located and mutually corresponding cutouts or recesses on the mounting member and on the shoulder of the coil member.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
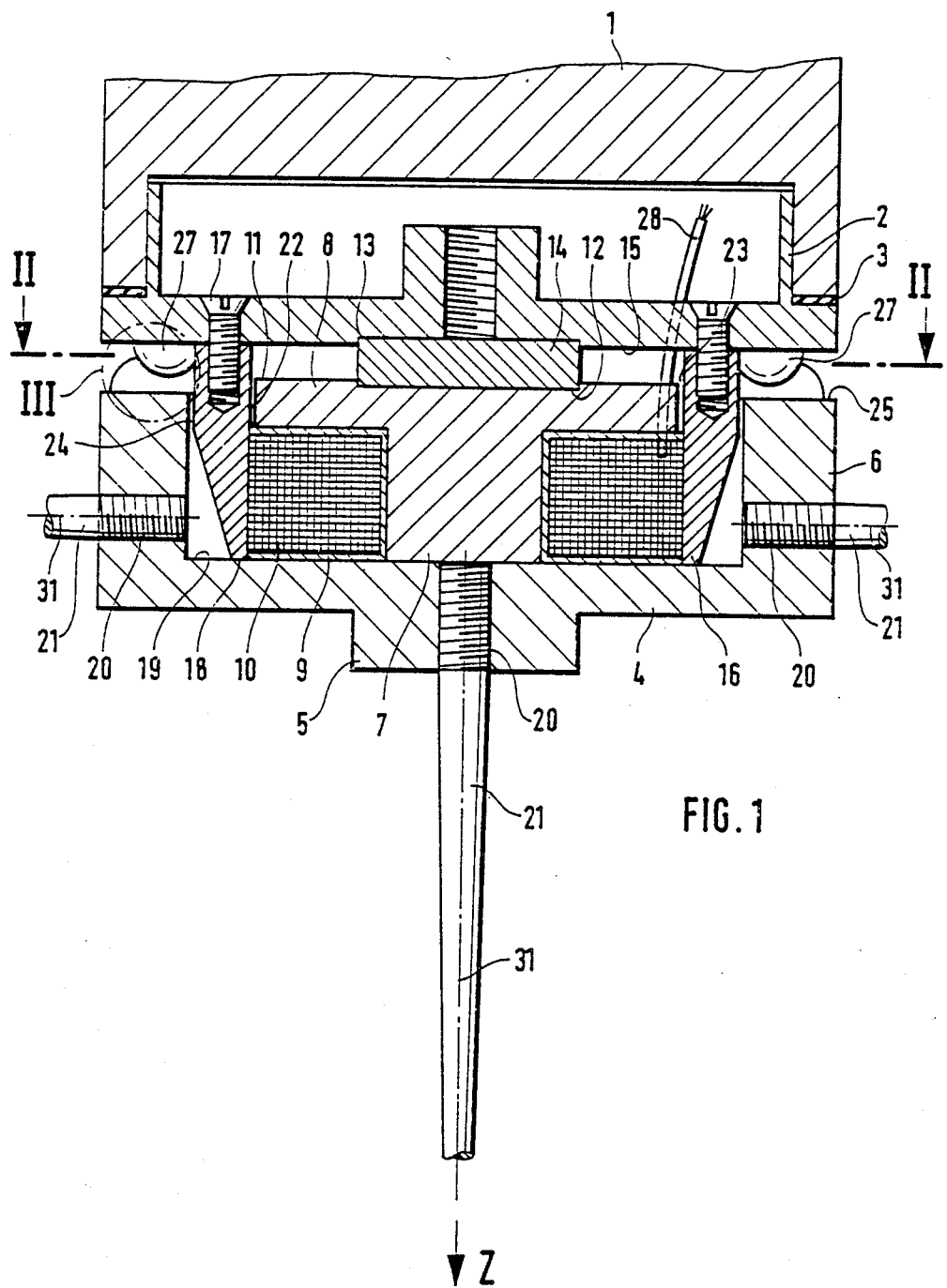
FIG. 1 illustrates the inventive probe stylus changing mounting in a longitudinal sectional view.

Fastened to the probe or sensor head 1 for a coordinate measuring installation is a mounting member 2. This attachment or mounting which is not elucidated in more detail, for example, can be implemented through a screw connection. A sealing ring 3 is positioned between the probe 1 and a ring-shaped flange surface on the mounting member 2. Below the mounting member 2 and in an coaxial arrangement relative thereto, pursuant to the illustration in FIG. 1, there is retained the connecting member 4, the latter of which is cup-shaped in form and includes a bottom 5 as well as a ring-shaped or annular mantle surface 6. Centrally inserted into the connecting member 4 is a coil member 7 possessing a shoulder 8 which, with the interposition of an aluminum cladding 9, receives the coil winding 10. A recess 12 is formed in the end surface 11 of the shoulder 8 of the coil member 7, facing the mounting member 2, which recess is coaxial with and in its dimensions in conformance with a recess 13 which is provided in the bottom surface of the mounting member 2. The permanent magnet 14 is introduced into these two oppositely located recesses 12 and 13 so as to be secured against any displacement. The permanent magnet which is formed from the noble metal consisting of neodymium with an extremely high energy product, is fixedly connected with the coil member 7 as well as with the mounting member 2.

A steel ring 16 is retained by means of screws 17 against the lower side of the bottom surface 15 of the mounting member 2, which ring possesses an end surface 18 which is substantially smaller in comparison with the oppositely facing contacting surface on the mounting member 2, and with which the steel ring 16, at a received connecting member 4, stands supported on the bottom surface 19 of the connecting member 4. This relatively small end surface 18 forms the retaining surface for the mounting of the connecting member 4 on the mounting member 2. The steel ring 16 and the coil member 7 are produced from the material Vakoflux which possesses an extremely high magnetic saturation, which renders possible the miniature mode of construction, especially with regard to the steel ring 16. In the bottom surface 5 and in the cylindrical mantle surface 6 of the connecting member 4 there are provided mounting bores 20 for the feeler or probe element 21 which is to be employed.

An air gap 23 is provided between the outer mantle surface 22 of the shoulder 8 on the core member 7 and the inner annular surface of the steel ring 16. A further smaller air gap 24 is located between the outer mantle surface of the steel ring 16 and the cylindrical wall 6 of the connecting member 4. Three cylindrical half-rollers 26 are adhered to the upper end surface 25 to the cylindrical wall 6, which are uniformly distributed by respectively 120° relative to each other. These cylindrical half-rollers 26, upon the contacting of the connecting member 4 against the mounting member 2, engage into respectively two mutually spaced hemi-spheres 27 in a centered contact. These hemi-spheres 27 are connected with the base surface 15 of the mounting member 2 through adhesion or glueing. The coil 10 is electrically connected with the coordinate measuring machine through the intermediary of an electrical cable 28, the latter of which extends through an opening 29 in the coil member 7 and the mounting member 2. As can be ascertained from FIGS. 1 and 2, the axes 30 of the cylindrical hemi-spheres 26 as well as the longitudinal axes 31 of the styli or feelers 21 intersect in the zero coordinate point 32 which is formed by the coordinates X, Y and Z.

Figure 2:
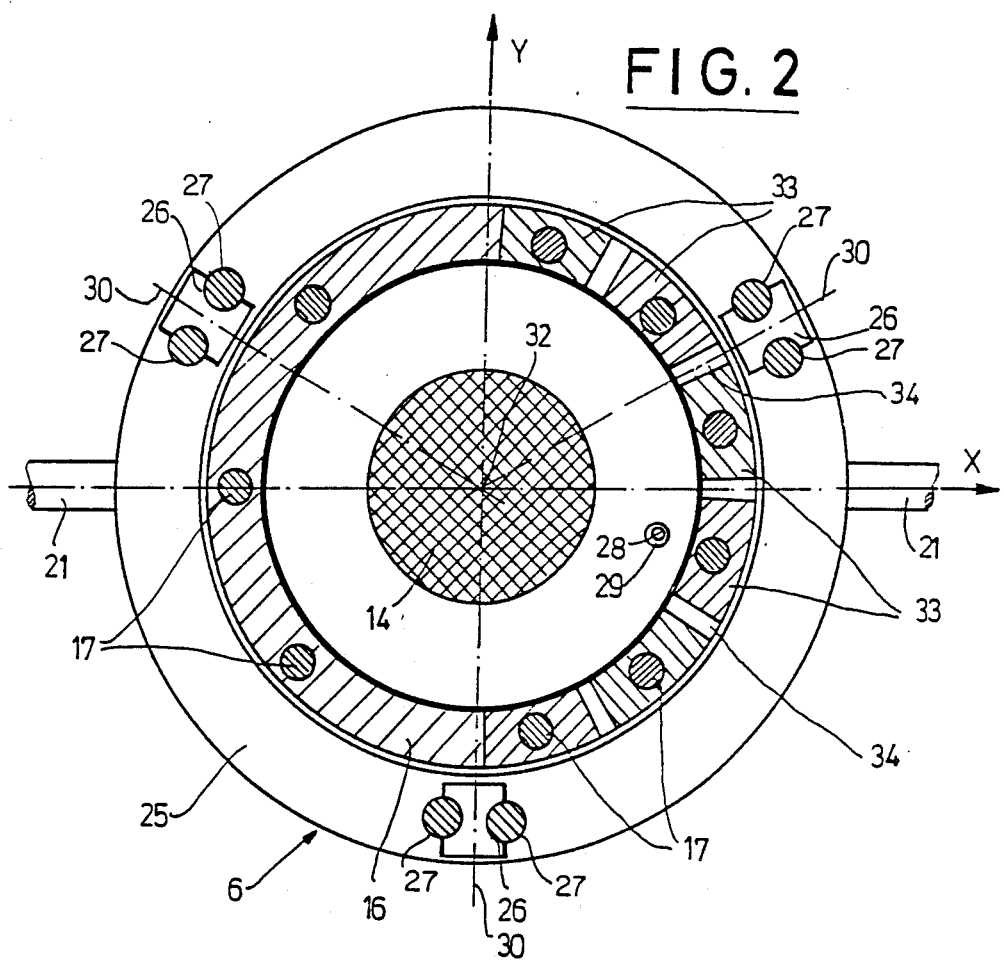
FIG. 2 illustrates a transverse sectional view through the probe stylus changing mounting taken along line II—II in FIG. 1.
Figure 3:
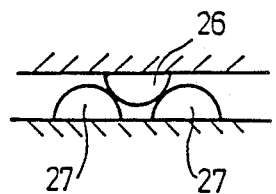
FIG. 3 illustrates the bearing location shown in a side view in the encircled portion III in FIG. 1.

As is illustrated in FIG. 2, in lieu of the single-piece steel ring 16 there can be also provided a steel ring which consists of a plurality of segments 33 which are arranged at spacings relative to each other. In order to illustrate the foregoing, in FIG. 2 the steel ring 16 is shown separated along the coordinate axis X. In order to afford a uniform spacing 26 of the segments 33 with respect to each other, spacers 34 are arranged intermediate the individual segments 33.

In the arrangement illustrated in FIG. 1, the connecting member 4 for the probe elements 21, by means of the bearing locations 26 and 27, are maintained in a centralized contact against the mounting member 2. This contacting is occasioned by the permanent magnet 14 which, through the end surface 18 of the steel ring 16, draws the connecting member by means of electromagnetic force in the direction of the coordinates Z against the mounting member 2. For effectuating the release of the mounting member 4, the coil 10 is supplied with electric current through the electrical cable 28, until an opposite magnetic field is generated in comparison with that from the permanent magnet 14. This oppositely directed magnetic field must reach at least the magnitude of that of the magnetic field from the permanent magnet 14. As a result, there is nullified the attractive force of the permanent magnet through the steel ring 16, and the connecting member 4 is then separable from the mounting member 2. Notwithstanding the extremely small retaining surface 18, the steel ring 16 possesses an extremely large adhesive force of about 16 kp. The electromagnet (coil member 7) which is formed by the supplying of the coil 10 with electric current, acts across the air gap 23 between the shoulder 22 and the steel ring 16, inasmuch as this air gap 23 is maintained extremely narrow.

As can be ascertained from the drawings, the entire connecting member 4 consists of only a cup-shaped structure, into which there immerse the permanent magnet 14 and the coil member 7 upon the mounting or attachment on the mounting member 2.

Within the context of the invention, the permanent magnet 14 and the coil member 7 with the coil 10 inserted therein can be fastened on the mounting member 2 as either a structural module, or associated as a module with the connecting member 4. The positioning is essentially always effected by means of the recess 13 for the permanent magnet within steel ring 16. As an alternative to these two possibilities there can also be contemplated fixedly associating the permanent magnet 14 with the mounting member 2, whereas the module consisting of the coils 10 and the coil member 7 can be fixedly inserted into the connecting member 4.

What is claimed is:

1. Mounting arrangement for the exchangeable attachment of probe stylus means on a probe head for a coordinate measuring arrangement, said arrangement comprising an electrically-operating clamping means having a permanent magnet and an electromagnet, said electromagnet generating a field which is superimposed on a field generated by the permanent magnet; a connecting member for the probe stylus means being drawn by said clamping means against a bearing on a mounting member on said probe head for determining the position of said connecting member, said connecting member being cup-shaped and arranged coaxially below the mounting member; a steel ring which is connected to the mounting member being received by said connecting member at a radial spacing relative to a cylindrical wall of said connecting member; said electromagnet including a coil member with a coil winding which is centrally arranged in said connecting member, said coil member having a unitarily attached upper shoulder supporting the permanent magnet on an end surface and having a mantle surface arranged at a radial spacing relative to the steel ring in said connecting member.

2. A mounting arrangement as claimed in claim 1, wherein screws fixedly connect the steel ring with said mounting member.

3. A mounting arrangement as claimed in claim 1, wherein the steel ring has a smaller foot surface in comparison with the upper end surface thereof, said foot surface being supported on an inner bottom surface of the connecting member.

4. A mounting arrangement as claimed in claim 1, wherein three uniformly distributed cylindrical half-rollers are arranged on a surface of the cylindrical wall of the connecting member facing towards said mounting member, the longitudinal axes of said half-rollers intersecting in the zero coordinate point of the connecting member so as to centrally engage between respectively two hemispheres which are fastened on the mounting member.

5. A mounting arrangement as claimed in claim 4, wherein said cylindrical half-rollers and the hemispheres are adhesively fastened along the mounting surfaces thereof.

6. A mounting arrangement as claimed in claim 1, wherein said steel ring comprises a plurality of individual segments arranged at selective spacings with respect to each other.

7. A mounting arrangement as claimed in claim 1, wherein said steel ring and said coil member are constituted of a material possessing a high magnetic saturation.

8. A mounting arrangement as claimed in claim 7, wherein said steel ring and said coil member are constituted of Vakoflux.

9. A mounting arrangement as claimed in claim 1, wherein said permanent magnet comprises the noble metal consisting of neodymium.

10. A mounting arrangement as claimed in claim 1, wherein said connecting member includes receiving openings for said probe stylus means, said openings being respectively located radially in the cylindrical wall and in the bottom surface of the connecting member, and the longitudinal axes of which openings intersect in the zero coordinate point of the connecting member.

11. A mounting arrangement as claimed in claim 1, wherein said permanent magnet is inserted in oppositely located and mutually conformed recesses in the mounting member and in a shoulder on the coil member.

* * * * *